Oct. 24, 1939.    W. A. PURTELL    2,177,003
SELF-LOCKING SCREW
Filed Oct. 9, 1937
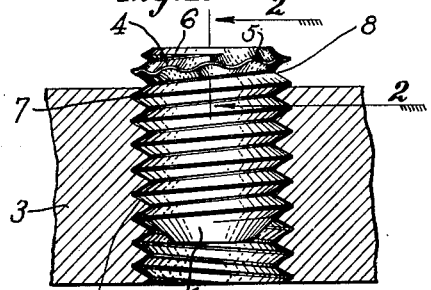
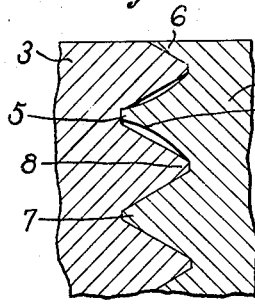 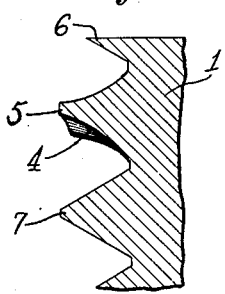 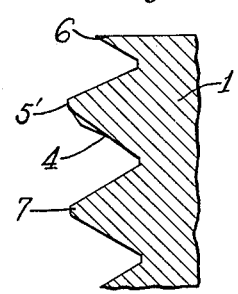
INVENTOR
William A. Purtell.
By
ATTORNEY.

Patented Oct. 24, 1939

2,177,003

UNITED STATES PATENT OFFICE 2,177,003

SELF-LOCKING SCREW

William A. Purtell, West Hartford, Conn.

Application October 9, 1937, Serial No. 168,238

6 Claims. (Cl. 151—22)

My invention relates to self-locking screws.

It has among its objects to provide an improved screw having improved means in its threads to act against loosening of the screw after it has been entered in a companion tapped member, while permitting ready insertion of the screw. A further object of my invention is to provide an improved portion on the threads of screws whereby the screws are prevented from working loose, as by vibration or other uncontrolled stresses. Another object is to provide an improved self-locking screw having one or more turns of its thread shaped in an improved wave-like form to bind against the standard edges of the thread of a companion member, the wavy edge on the thread being formed at little or no additional cost over the expense of producing standard threads. These and other objects, together with other advantages of my improved construction, will hereinafter more fully appear.

In the accompanying drawing, I have shown for purposes of illustration certain forms which my invention may assume in practice.

In the drawing:

Figure 1 is a side view of a set screw embodying the features of my invention, the screw being shown partly inserted in a companion member, illustrated in section;

Fig. 2 is an enlarged axial sectional view of a part of the screw and companion member taken on the line 2—2 of Figure 1 but showing the screw fully inserted in the companion member;

Fig. 3 is a similar view on the line 2—2, the companion member being omitted;

Fig. 4 is a view similar to Figure 3, showing an alternative form of locking screw, and Fig. 5 is a straight line projection of the edge of the thread in either form of locking screw.

Reference is first made to Figure 1, in which I have shown a socketed set screw 1, having any standard or suitable thread 2 thereon and being entered in a tapped companion member 3, a part of the thread 2 being formed in an improved manner, as indicated at 4, to produce my improved locking means.

Herein, my improved locking means is provided preferably in the second turn of the thread 2 from the outer end of the screw, although it will be understood that any other desired turn of the thread, or that more than one turn of the thread, may be so provided. The locking means comprises, as shown in Figures 1, 2 and 3, a turn of the thread in which the standard thread angle has been reduced and in which the face of the thread is concave in profile and tapered outwardly to a thin edge or crest 5, the thin edge being made wavy or ruffled in contour so that it will appear when projected, as in Figure 5, as a typical plotted curve of the sine of an angle. Thus, in the locking turn of thread 4, the crest 5 of the thread is alternately near the crest 6 of the turn of thread which follows and near the crest 7 of the turn of thread which precedes it, while the crest 8 of any turn of the thread of the tapped companion member 3 is equidistant at all points from the crest of the adjoining turns of thread.

As a result, different waves of the several component waves in the thin wavy edge 5 of the locking turn of thread, because of their shape, bind against the more rigid and stronger root, or base, of the female threads 8 on each side of the turn 4 as the screw 1 is entered in the companion member, and tend to bind more tightly as the screw is driven further into place. With unhardened members 1 and 3, the improved locking thread binds effectively, while with the more usual hardened members the shape of the wavy turn of thread increases the inherent resiliency or spring in the steel and gives a very satisfactory binding effect.

If desired, the locking turn 4 of the thread 2 may be of a standard thread size and angle, conforming to the other turns of the thread, and a wavy contour 5' may be provided on the crest of the turn, see Fig. 4. It will be appreciated that the contour 5' when projected will appear similar to a projection of the wavy crest 5 in the previous form. As a result of my improved locking means by which the waves in the thread are confined to the crest of the male thread of an otherwise normal screw thread, no deformation of the companion thread takes place when the latter is engaged by the locking turn or turns of the male thread. Instead, the wavy crest portion of the thread engages the stronger root, or base, portion of the companion thread which resists deformation while providing the desired cramping action to prevent loosening of the screw.

When a screw provided with my improved locking means in either form, is entered into a companion member, it will be noted that the last turn, or turns, of the screw causes an effective interlocking between the respective threads of the member so that considerable force is required to turn out the screw when once entered. The binding action of the crest of the thread is sufficient to prevent loosening by vibration or other jarring actions and the screw remains firmly seated in the tapped opening until removed by manual means. Attention is here directed to the possibility of providing set screws, cap screws and other threaded fastening members with my improved locking means at little or no additional cost, while increasing the utility and effectiveness of these members. It will also be evident that the screw may be of the self-tapping type, i. e. wherein the first threads thereof form corresponding threads in a previously untapped companion member. These and other advantages of my improved construction will, however, be clearly apparent to those skilled in the art.

While I have in this application specifically shown certain embodiments which my invention may assume in practice, it will be understood that the same are shown for purposes of illustration and that the same may be modified and embodied in other forms without departing from its spirit or the scope of the appended claims.

What I claim as new and desire to secure by Letters Patent is:

1. In a locking screw, means on the thread of the screw to grip the thread of a companion member, comprising a series of reverse waves in the crest on a portion of the thread and a normal root for said portion.

2. In a locking screw, means on the thread to cause binding with the thread of a companion member, said means comprising a portion of thread having a base free from off-sets in profile and a crest deformed alternately in direction to touch alternately the stronger root portion of the following and preceding turns of thread of the companion member and to bind against the same.

3. In a locking screw, means on the thread to cause locking with the cooperating thread of a companion member, said means comprising a resiliently tempered thread portion having a base free from off-sets in profile and on which the crest is in the form of a wave providing contact without deformation of the side of the stronger root portion of said cooperating thread in the companion member.

4. In a locking screw, means on the thread to cause locking with the cooperating thread of a companion member, said means comprising a resiliently tempered thread portion having a base free from off-sets in profile and on which the crest has a plurality of oppositely directed waves providing contact with the opposite sides of the stronger root portion of turns of said cooperating thread in the companion member adjacent said waves and without deformation of said root portion.

5. In a locking screw, means on the thread to cause locking with the cooperating thread of a companion member, said means comprising a thread portion in which the face of the thread is concave in profile and on which the crest is in the form of a wave providing contact with the side of the cooperating thread in the companion member.

6. In a locking screw, means on the thread to cause locking with the normal thread of a companion member, said means comprising a thread portion having a base free from off-sets in profile in which the thread size is the same as that of the other turns and on which the crest is in the form of a wave providing binding contact without deformation of the side of the stronger root portion of said cooperating normal thread in the companion member.

WILLIAM A. PURTELL.